United States Patent
Andrews

(10) Patent No.: US 9,423,073 B2
(45) Date of Patent: Aug. 23, 2016

(54) METHOD OF CATCHING LUBRICANT AS IT IS DRAINED FROM THE WHEEL HUB OF A VEHICLE, AND A DRAIN PAN FOR THE SAME

(76) Inventor: Russ Darrel Andrews, St. Clair, MO (US)

(*) Notice: Subject to any disclaimer, the term of this patent is extended or adjusted under 35 U.S.C. 154(b) by 1595 days.

(21) Appl. No.: 12/720,921

(22) Filed: Mar. 10, 2010

(65) Prior Publication Data

US 2011/0220658 A1    Sep. 15, 2011

(51) Int. Cl.
 *B65D 1/34* (2006.01)
 *F16N 31/00* (2006.01)
 *B65D 1/22* (2006.01)

(52) U.S. Cl.
 CPC .............. *F16N 31/002* (2013.01); *B65D 1/22* (2013.01)

(58) Field of Classification Search
 USPC .............. 220/571, 573; 184/106; 180/69.1; 296/38; 206/319, 335
 See application file for complete search history.

(56) References Cited

U.S. PATENT DOCUMENTS

| | | | |
|---|---|---|---|
| 4,576,301 A | 3/1986 | Tedder | |
| 4,770,276 A * | 9/1988 | Takubo | 184/106 |
| 4,848,293 A * | 7/1989 | Sasada et al. | 123/195 C |
| 5,655,624 A | 8/1997 | Kelly, Jr. | |
| 6,454,121 B1 | 9/2002 | Kurtz et al. | |
| 7,673,658 B1 * | 3/2010 | Brewer et al. | 141/86 |

OTHER PUBLICATIONS

STEMCO, Dually Drain Pan Brochure, obtained from www.duallydrainpan.com/pdf/dually_drain_pan_brochure.pdf, date unknown, 1 page, applicant admits that the drain pan shown therein was on sale in the U.S. more than one year prior to the priority date of the present application.

* cited by examiner

*Primary Examiner* — Anthony Stashick
*Assistant Examiner* — Robert Poon
(74) *Attorney, Agent, or Firm* — Thompson Coburn, LLP; Clyde Smith

(57) ABSTRACT

A drain pan for catching lubricant as the lubricant is drained from the wheel hub of a vehicle. The drain pan comprises lug openings, which allow the drain pan to be removably secured to the lugs of vehicle wheels in a manner preventing the drain pan from being unintentionally moved during the draining process.

3 Claims, 4 Drawing Sheets

METHOD OF CATCHING LUBRICANT AS IT IS DRAINED FROM THE WHEEL HUB OF A VEHICLE, AND A DRAIN PAN FOR THE SAME

CROSS-REFERENCE TO RELATED APPLICATIONS

Not Applicable

STATEMENT REGARDING FEDERALLY SPONSORED RESEARCH OR DEVELOPMENT

Not Applicable.

APPENDIX

Not Applicable.

BACKGROUND OF THE INVENTION

Field of the Invention

This invention pertains generally to a drain pan that is configured to catch lubricant as it is drained from the wheel hub of a vehicle, and to a method of using the same. More specifically, this invention pertains to a drain pan that is configured such that it can be removably secured to the lugs of vehicle wheels in a manner preventing the drain pan from being unintentionally moved during the draining process.

General Background

Commercial vehicles, such as buses and trucks and their trailers, require frequent routine maintenance due to the high miles they are driven per year. One such maintenance task is changing wheel bearing lubricant and servicing the wheel bearings and seals. Unlike automobiles, the wheel hubs of truck wheels often comprise low viscosity lubricants that flow like liquids, as opposed to just grease. Such lubricants are periodically drained and replaced as they near their service life, or when wheel bearings or seals require service. This is done by removing a cap or plug on the wheel hub while the wheel remains attached to the wheel hub. This makes it difficult to capture the lubricant that drains out during the process due to the fact that the wheel surrounds the wheel hub and a common drain pan cannot be placed directly beneath the wheel hub. As such, specially configured drain pans have been created to capture lubricants as such lubricants drain from truck wheel hubs. An example of such a drain pan is described in U.S. Pat. No. 6,454,121, which is hereby incorporated by reference in its entirety. Such drain pans are configured to be placed on the rim of the wheel beneath the wheel hub. However, such drain pans can easily unintentionally spill during the process of servicing the wheel hub. Cleaning-up such spillage can add appreciably to the time it takes for a servicemen to service a truck.

SUMMARY OF THE INVENTION

The present invention overcomes the problems associated with unintentional lubricant spillage when truck wheels are serviced. This is achieved by configuring a drain pan such that it can be removably secured to the lugs of truck wheels in a manner preventing the drain pan from being unintentionally moved during the draining process.

One aspect of the invention pertains to a method of draining lubricant from a vehicle that comprises a wheel hub that has a cap and plurality of wheel lugs. The method comprises a step of obtaining a drain pan. The drain pan has a cavity that is partially bound by a rear wall. The rear wall has a plurality of lug openings that extend therethrough. The method also comprises moving the drain pan toward the wheel hub in a manner such that at least two of the wheel lugs extend through the lug openings of the rear wall of the drain pan. Still further, the method comprises removing the cap from the wheel hub, while the wheel lugs extend through the lug openings as recited. Still further, the method comprises allowing lubricant to drain from the wheel hub into the cavity of the drain pan, again, while the wheel lugs extend through the lug openings as recited.

Another aspect of the invention pertains to a method of draining lubricant from a vehicle that comprises a wheel hub having a cap and plurality of wheel lugs. The wheel lugs are spaced circumferentially about a wheel axis. The method comprises a step of obtaining a drain pan. The drain pan has a cavity that is partially bound by a rear wall. The rear wall has at least one lug opening that extends therethrough. The method also comprises removably securing the drain pan to the wheel hub by positioning the drain pan such that one of the wheel lugs extends through the lug opening, and by threading a nut onto said one wheel lug while said one wheel lug extends through the lug opening as recited. The method further comprises removing the cap from the wheel hub and allowing lubricant to drain from the wheel hub into the cavity of the drain pan, all while said one wheel lug extends through the lug opening as recited.

Yet another aspect of the invention is directed to a drain pan for draining lubricant from a vehicle. The drain pan comprises a rear wall and has a cavity that is partially bound by the rear wall and that is open from above. The rear wall has a plurality of lug openings extending therethrough. The lug openings are circumferentially spaced about an axis. The drain pan is configured and adapted to be supported by a wheel hub having a plurality of wheel lugs by positioning at least two of the wheels lugs in a manner such that said wheel lugs extend through the lug openings of the rear wall of the drain pan.

Further features and advantages of the present invention, as well as the operation of the invention, are described in detail below with reference to the accompanying drawings.

Figure 1:
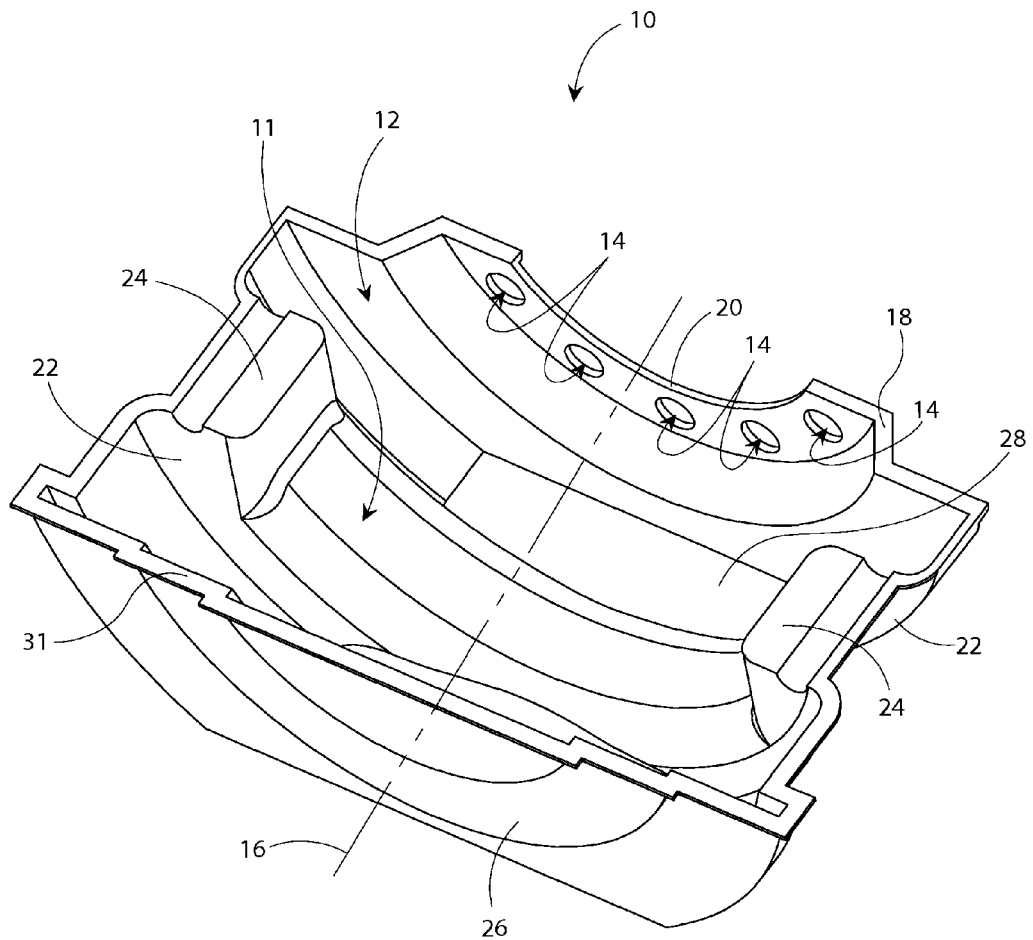
FIG. 1 is a perspective view of an embodiment of a drain pan in accordance with the invention, as viewed from above, to the right side of, and in front of the drain pan.
Figure 2:
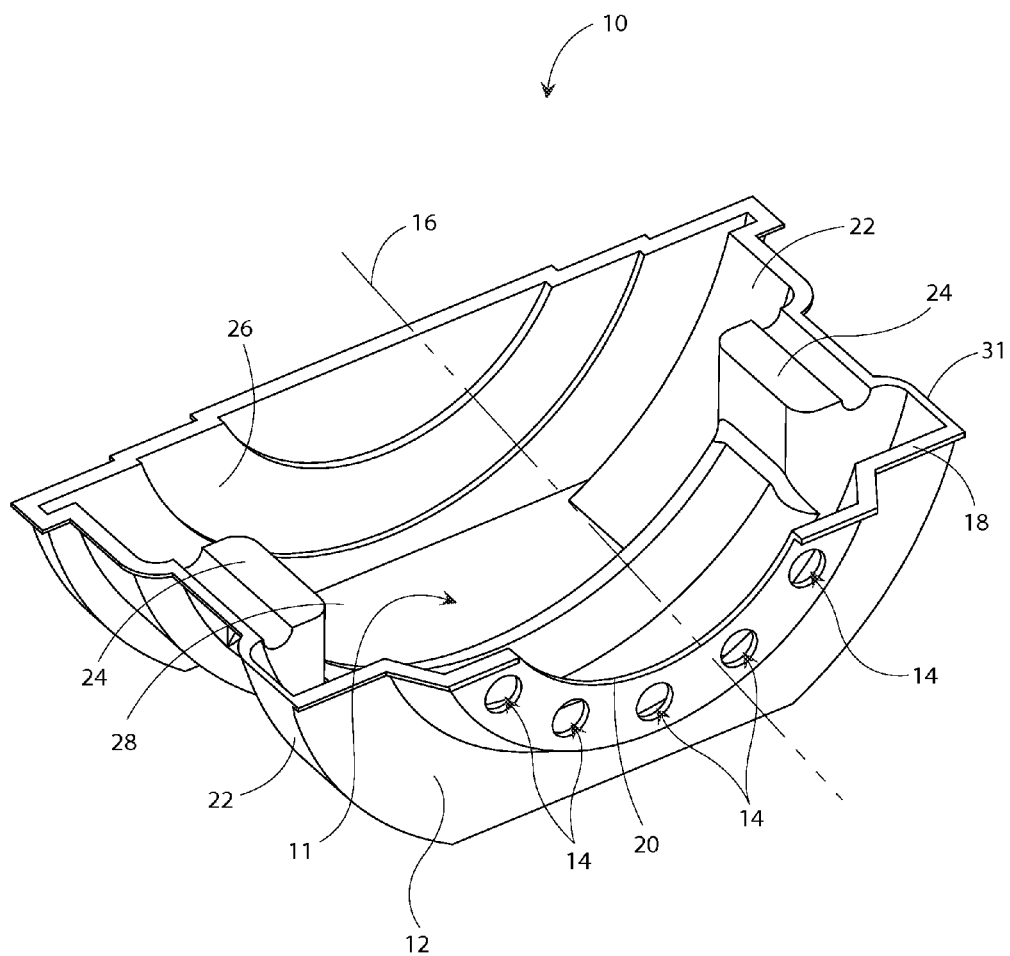
FIG. 2 is a perspective view of the drain pan shown in FIG. 1, as viewed from above, to the right side of, and from behind the drain pan.
Figure 3:
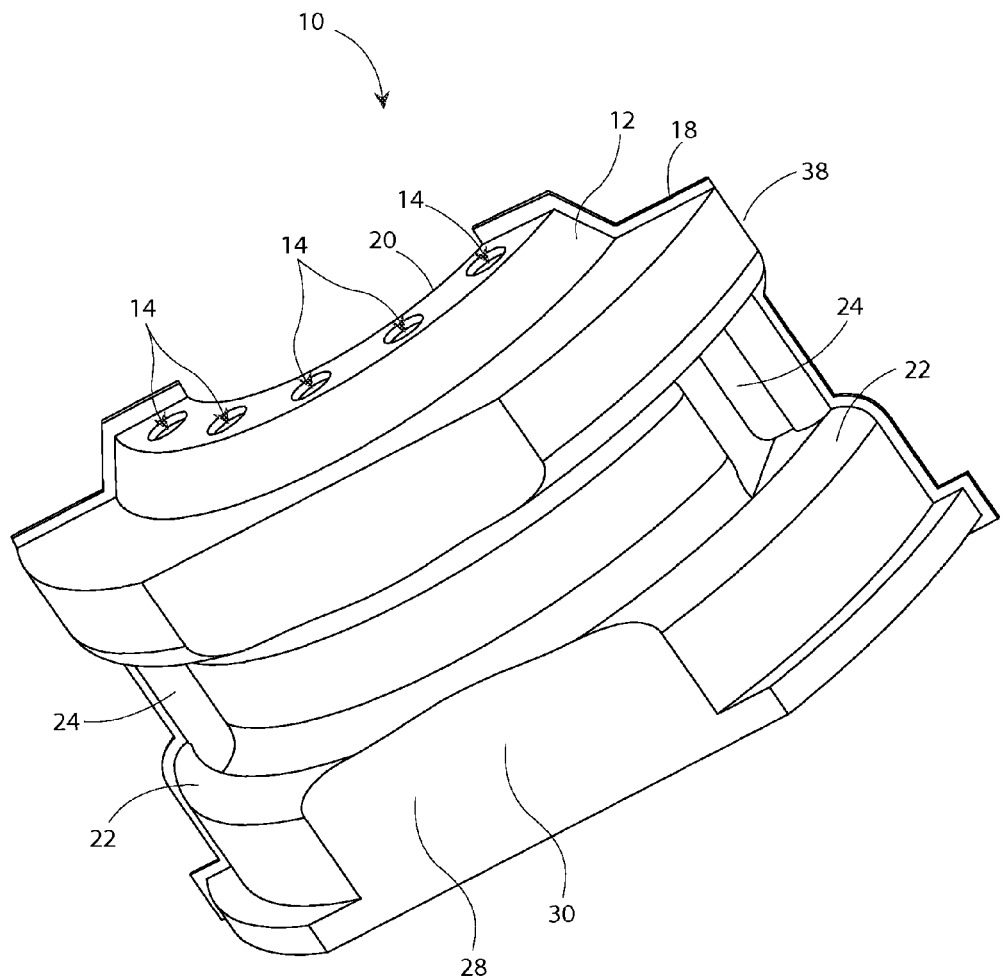
FIG. 3 is a bottom perspective view of the drain pan shown in FIGS. 1 and 2, as viewed from beneath, to the left of, and from behind the drain pan.

Reference numerals in the written specification and in the drawing figures indicate corresponding items.

DETAILED DESCRIPTION

A preferred embodiment of a drain pan in accordance with the invention is indicated by the reference numeral 10 in the drawing figures. The drain pan 10 is preferably formed of polymeric material that forms a thin-walled shell that bounds a cavity 11 that is open from above.

The rear wall 12 of the drain pan 10 comprises a plurality of lug openings 14 that extend therethrough. The lug openings 14 are preferably cylindrical and are spaced from each other circumferential about a horizontal axis 16, which lies above the drain pan 10 and that extends perpendicular to the rear wall 12. As the rear wall 12 extends radially away from the axis 16, the rear wall jogs axially forward, and then extends directly in the radial direction again. This jogging increases the out of plane stiffness of the rear wall 12 in a manner by increasing its overall out of plane bending stiffness. The top edge 18 of the rear 12 wall dips down centrally in an arcuate manner forming an arcuate opening 20 through the rear wall.

The side walls 22 of the drain pan 10 are generally symmetric and extend in a generally circumferential direction about the axis 16. The side walls 22 jog radially inward and then outward again as they extend from front to rear. This not only provides for increased stiffness, but also provides for the easy formation of handles 24. The front wall 26 of the drain pan 10 is similar to the rear wall 12, but lacks the lug openings 14 and the arcuate opening 20, and jogs slightly less as it extends radially away from the axis 16. The bottom wall 28 of the drain pan 10 extends between the front, rear, and side walls 26, 12, 22 of the drain pan and defines a flat bottom surface 30 that is configured to support the drain pan in its upright orientation on a flat horizontal surface. Finally, a lip 31 preferably extends around the majority of the uppermost perimeter of the drain pan 10, except along edge of the arcuate opening 20 of the rear wall 12 and along the rearmost portions of the side walls, which adds to the stiffness of the drain pan.

Figure 4:
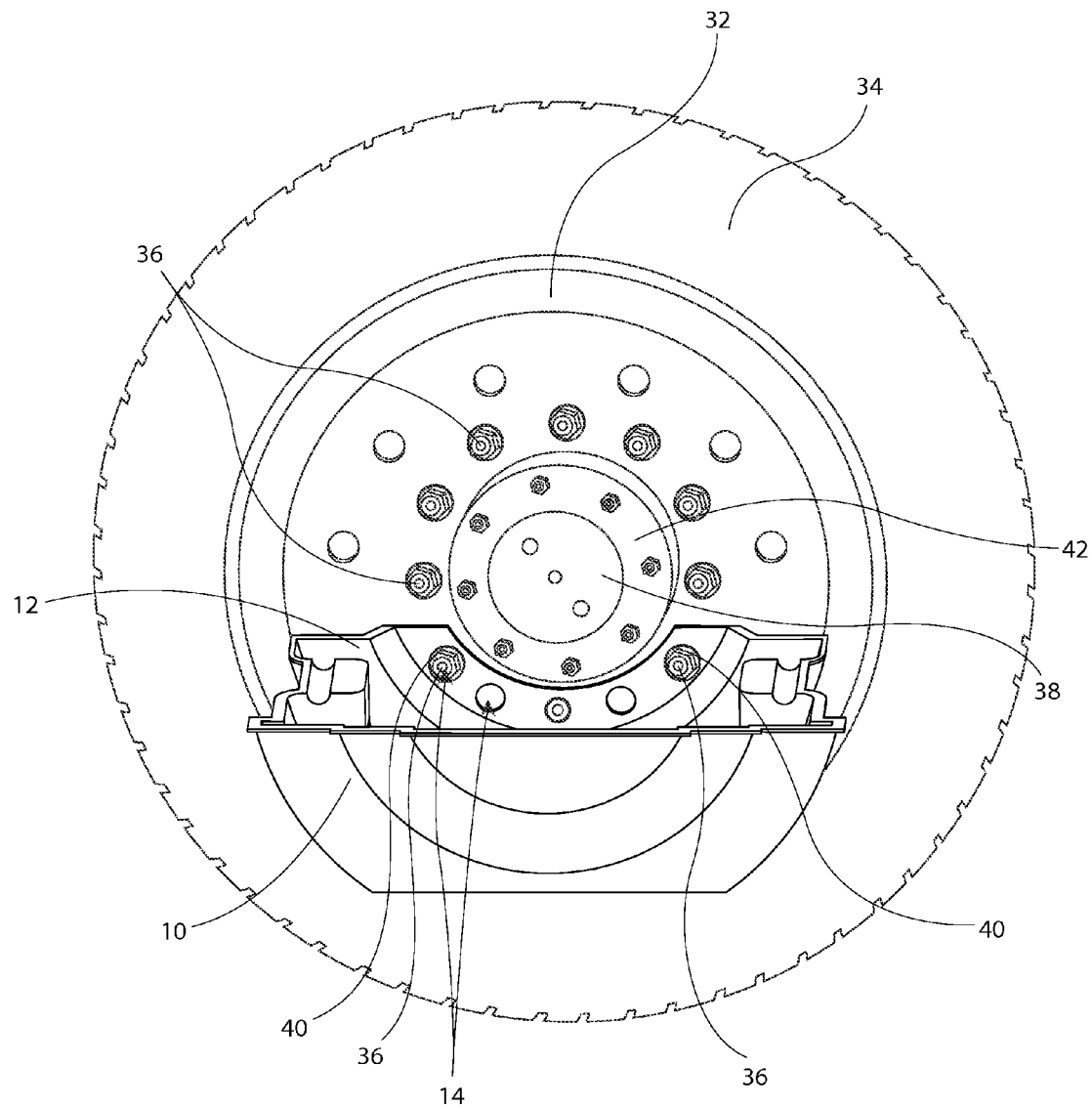
FIG. 4 is a perspective view of the drain pan shown in FIGS. 1-3, and shows the drain pan attached to a truck wheel.

Having described the configuration of the drain pan 10, the intended use of the drain pan in connection with a truck wheel will now be explained by reference to FIG. 4. As shown in FIG. 4, the drain pan 10 is configured to be attached to the wheel hub 32 of a vehicle wheel, preferably a truck wheel 34. This begins by aligning the axis 16 of the drain pan 10 with the rotational axis of the truck wheel 34, and by aligning the lug openings 14 of the rear wall 12 of the drain pan with the lowermost wheel lugs 36 of the truck wheel. Aligned in this manner, the drain pan 10 is then moved axially toward the truck wheel 34 until it bears against the truck wheel with the lowermost wheel lugs 36 extending through the lug openings 14 of the rear wall 12 of the drain pan. It should be appreciated that the arcuate opening 20 of the rear wall 12 of the drain pan 10 allows the forwardmost portion 38 of the wheel hub 32 to extend through the arcuate opening. This allows the uppermost portions of the drain pan 10 to be positioned above the lowermost part of said portion 38 of the wheel hub 32. With the wheel lugs 36 extending through the lug openings 14, the drain pan 10 can be released, where it will remain fully supported from the wheel lugs. However, to ensure that the drain pan 10 does not slip forward off of the wheel lugs 36, one or more threaded nuts 40 is preferably threaded onto one or more of the wheel lugs 36 that extend through the lug openings 14 of the drain pan 10. This is done from within the cavity 11 of the drain pan 10. It should be appreciated that the lug openings 14 are dimensioned such that the threaded nuts 40 cannot pass therethrough, and thereby prevent the drain pan 10 from unintentionally slipping off of the wheel lugs 36.

With the drain pan 10 secured to the wheel 34 and wheel hub 32 as described above, the cap 42 that is attached to the wheel hub can then be removed to allow lubricant to drain from the wheel hub. It should be appreciated that, when attached, the cavity 11 of the drain pan 10 lies directly beneath the forward most portion 38 of the wheel hub 32 such that the lubricate drains into the cavity via gravity. It should also be appreciated that, because the uppermost portion of the drain pan 10 is positioned above the lowermost part of forwardmost portion 38 of the wheel hub 32 that extends through the arcuate opening 20 of the drain pan 10, the uppermost portion of the drain pan helps contain lubricant from splashing out of the cavity 11 of the drain pan when such lubricant is being drained. After the lubricant is no longer draining from the wheel hub 32, the wheel bearings of the truck wheel (not shown) can be serviced or replaced, and the cap 42 is thereafter reattached to the wheel hub 32. With the cap 42 reattached to the wheel hub 32, new lubricant can be added to the wheel hub 32 and the drain pan 10 can be removed from the wheel 34 and wheel hub 32 using the handles 24 of the drain pan. The drain pan 10 is removed from the wheel 34 and wheel hub 32 by reversing the steps of attaching the drain pan thereto. The drain pan 10, now containing the spent lubricant, can be placed on a horizontal surface, where it will be supported upright by the bottom surface 30 of the drain pan until the person servicing the truck is ready to dispose of or recycle the lubricant.

In view of the foregoing, it should be appreciated that the drain pan of the present invention minimizes the risk of unintentional spillage of lubricant resulting from the drain pan moving during the drainage process. It should also be appreciated that the configuration of the drain pan is such that it can easily be thermoformed or injection molded.

In view of the foregoing, it should be appreciated that the invention achieves the several advantages over prior art drain pans.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by the above-described exemplary embodiment, but should be defined only in accordance with the following claims appended hereto and their equivalents.

It should also be understood that when introducing elements of the present invention in the claims or in the above description of exemplary embodiments of the invention, the terms "comprising," "including," and "having" are intended to be open-ended and mean that there may be additional elements other than the listed elements. Additionally, the term "portion" should be construed as meaning some or all of the item or element that it qualifies. Moreover, use of identifiers such as first, second, and third should not be construed in a manner imposing any relative position or time sequence between limitations. Still further, the order in which the steps of any method claim that follows are presented should not be construed in a manner limiting the order in which such steps must be performed.

What is claimed is:

1. A drain pan for draining lubricant from a vehicle, the drain pan comprising:
   a rear wall, the rear wall having a plurality of lug openings extending therethrough, the lug openings being circumferentially spaced about an axis;
   a cavity that is partially bound by the rear wall and that is open from above;
   the drain pan being configured and adapted to be supported by a wheel hub that has a plurality of wheel lugs by positioning at least two of the wheels lugs in a manner such that said wheel lugs extend through the lug openings of the rear wall of the drain pan.

2. A drain pan in accordance with claim 1 wherein the drain pan comprises a front wall and two side walls that partially bound the cavity, the two side walls connect extend from the front wall to the rear wall, each of the side walls comprises a handle, the handles are symmetrically position about a vertical plan that extend through the axis.

3. A drain pan in accordance with claim 1 wherein the rear wall of the drain pan has an upper terminal edge that has a central portion that dips, the drain pan comprises a front wall and two side walls that partially bound the cavity, the two side walls connect extend from the front wall to the rear wall, and the front wall has an upper edge that extend linearly from one of the side walls to the other of the side walls.

* * * * *